US006052885A

United States Patent [19]
Carmien

[11] Patent Number: 6,052,885

[45] Date of Patent: Apr. 25, 2000

[54] METHOD OF MAKING A NONRECOIL IMPACT TOOL

[76] Inventor: Joseph Allen Carmien, 525 N. Maple Dr., Beverly Hills, Calif. 90210

[21] Appl. No.: 09/364,415

[22] Filed: Jul. 30, 1999

Related U.S. Application Data

[62] Division of application No. 09/042,139, Mar. 13, 1998.

[51] Int. Cl.[7] ........ B23P 11/00

[52] U.S. Cl. ........ 29/428; 81/22

[58] Field of Search ........ 29/428, 460, 527.2; 81/19, 20, 21, 22

[56] References Cited

U.S. PATENT DOCUMENTS

| | | | |
|---|---|---|---|
| 2,604,914 | 7/1952 | Kahlen | 81/19 |
| 2,737,216 | 3/1956 | Kenerson | 81/22 |
| 2,928,444 | 3/1960 | Ivins | 81/22 |
| 2,989,101 | 6/1961 | Carmien | 61/22 |
| 3,088,506 | 5/1963 | Bianchini | 145/36 |
| 3,172,438 | 3/1965 | Gianelli | 145/29 |
| 3,343,576 | 9/1967 | Norcross | 145/36 |
| 4,039,012 | 8/1977 | Cook | 145/29 R |
| 4,331,193 | 5/1982 | Tudisco | 145/29 R |
| 4,697,481 | 10/1987 | Maeda | 81/22 |
| 5,262,113 | 11/1993 | Carmien | 264/257 |
| 5,289,742 | 3/1994 | Vaughan, Jr. | 81/22 |
| 5,375,486 | 12/1994 | Carmien | 81/21 |
| 5,375,487 | 12/1994 | Zimmerman | 81/22 |
| 5,537,896 | 7/1996 | Halder | 81/26 |
| 5,916,338 | 6/1999 | Bergkvist et al. | 81/22 |
| 5,960,677 | 10/1999 | Carmien | 81/22 |

*Primary Examiner*—David P. Bryant
*Assistant Examiner*—Essama Omgba
*Attorney, Agent, or Firm*—Kelly Bauersfeld Lowry & Kelley, LLP

[57] ABSTRACT

An improved impact tool of the nonrecoil type is provided, to include a molded thermoplastic jacket encasing a hollow core canister having a flowable filler material such as small steel pellets or the like disposed therein and adapted to shift about within the canister for absorbing and dissipating impact shock forces. The hollow canister, which may be lightweight in construction, is partially filled with a selected quantity of the flowable filler material and the residual canister volume is occupied by at least one pulverable slug prior to placement of the canister into a mold for formation of the jacket thereon under heat and pressure. The pulverable slug has sufficient structural integrity to withstand molding temperatures and pressures, so that the slug and filler material cooperatively define a rigid structural backstop to prevent deformation of the hollow canister during the jacket molding step. Subsequently, upon initial use of the impact tool, impact forces cause the filler material to pulverize the slug for disbursement thereof as a powder into voids throughout the filler material, whereupon the filler material is permitted to shift about within the hollow canister to absorb and dissipate impact shock forces.

20 Claims, 2 Drawing Sheets

METHOD OF MAKING A NONRECOIL IMPACT TOOL

RELATED APPLICATION

This is a division of U.S. patent application Ser. No. 09/042,139, filed Mar. 13, 1998.

BACKGROUND OF THE INVENTION

This invention relates generally to hand tools and related manufacturing processes. More particularly, this invention relates to an improved impact or striking tool of the so-called nonrecoil or nonrebound type, such as a hammer or mallet, having an impact head constructed in accordance with an improved and simplified manufacturing process.

Impact tools of the so-called nonrecoil or nonrebound type are generally known in the art, such as a hammer or mallet having an impact head constructed to absorb and dissipate striking forces and thereby reduce or eliminate the bounce-back or rebound effect which normally occurs after striking a surface. Such impact tools typically have a hollow core canister or head filled partially with a relatively high mass and flowable filler material such as steel shot pellets, steel pins, or the like. In many designs, the hollow canister is protectively encased in whole or in part within a molded jacket or cladding constructed from a selected tough and durable thermoplastic material such as nylon. In use, when the tool head is impacted with a target surface, the filler material shifts and slides about within the hollow canister to absorb and dissipate the impact force and thereby effectively counteract any resultant rebound force. For examples, of such nonrecoil impact tools, see U.S. Pat. Nos. 5,262,113 and 5,375,486.

In the past, efforts to utilize a lightweight hollow canister in constructing a nonrecoil impact tool have encountered manufacturing problems during the molding step for encasing the hollow canister within the durable plastic jacket. More specifically, in this molding step, the hollow canister is placed within an injection mold and the plastic jacket material is then injected into the mold under substantial heat and pressure. When a lightweight canister of thin-walled metal or molded plastic material is used, the jacket molding parameters can cause undesirable distortion and deformation of the hollow canister sufficient to interfere with the desired shifting of the filler material to dissipate impact forces during use of the tool. In the past, this canister deformation problem has been addressed by completely filling the hollow canister with the filler material, whereby the filler material provides a rigid structural backstop to preclude deformation during the jacket molding step, after which a portion of the filler material is then removed from the canister through an open drain port or gate. However, this approach requires additional manufacturing steps such as post-molding removal of the excess filler material as well as the need to close the drain port. See, for example, U.S. Pat. Nos. 5,262,113 and 5,375,486.

The present invention overcomes these problems and disadvantages by providing an improved impact tool having a hollow core canister filled partially with a flowable filler material, but wherein the hollow canister is designed to withstand heat and pressure encountered in the course of a jacket molding step without significant risk of canister deformation or collapse, and further without requiring post-molding removal of any portion of the filler material.

SUMMARY OF THE INVENTION

In accordance with the invention, an improved nonrecoil impact tool and related method of manufacture are provided. The impact tool comprises an impact head in the form of a hollow core canister filled partially with a flowable filler material, with the residual canister volume occupied by a pulverable slug. The filler material and slug together form a substantially rigid structural backstop to maintain the size and shape integrity of the canister when it is placed into a mold cavity for injection mold formation of an outer plastic-based encasement or jacket. Subsequently, during initial use of the impact tool, the filler material crushes and pulverizes the slug to relatively small powder-like particles which partially fill small voids throughout the filler material and thereby permit the filler material to shift about during tool use for absorbing and dissipating impact forces.

In a preferred form, the impact tool comprises a hammer or mallet wherein the hollow core canister has an elongated and typically generally cylindrical shape with opposite ends thereof adapted to define or otherwise connect to impact caps with impact faces thereon. A handle member is connected to the hollow canister along one side thereof, at a location generally centered between the impact faces, to extend substantially perpendicular to a central axis of the hollow canister. The hollow canister together with at least a portion of the handle member are then placed into the mold cavity for injection mold formation of the outer jacket.

The flowable filler material comprises a relatively high mass material such as steel shot pellets or steel pins or the like placed into the hollow canister prior to the jacket molding step. The pulverable slug comprises a solid element formed from a material having a high strength under compression, but otherwise adapted to crush and break down into relatively small and preferably powder-like particles. A cementitious or lime or gypsum based substance such as a chalk stick or plaster of Paris plug or the like may be used, wherein the slug will break down into small particles as the flowable materials contacts and abrades the slug during initial impact blows struck by the tool.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
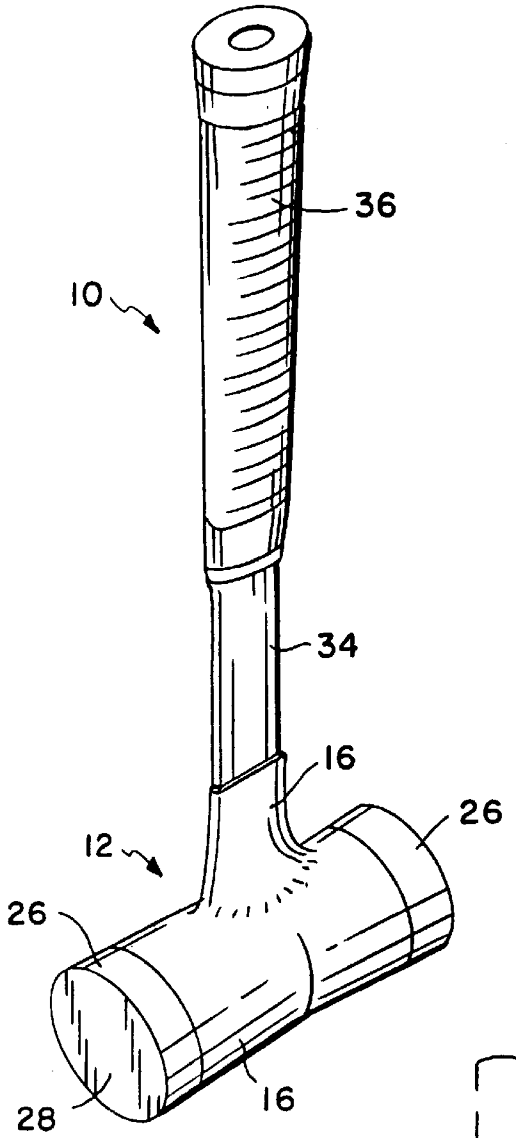
FIG. 1 is a perspective view illustrating a nonrecoil impact tool formed in accordance with the present invention.
Figure 2:
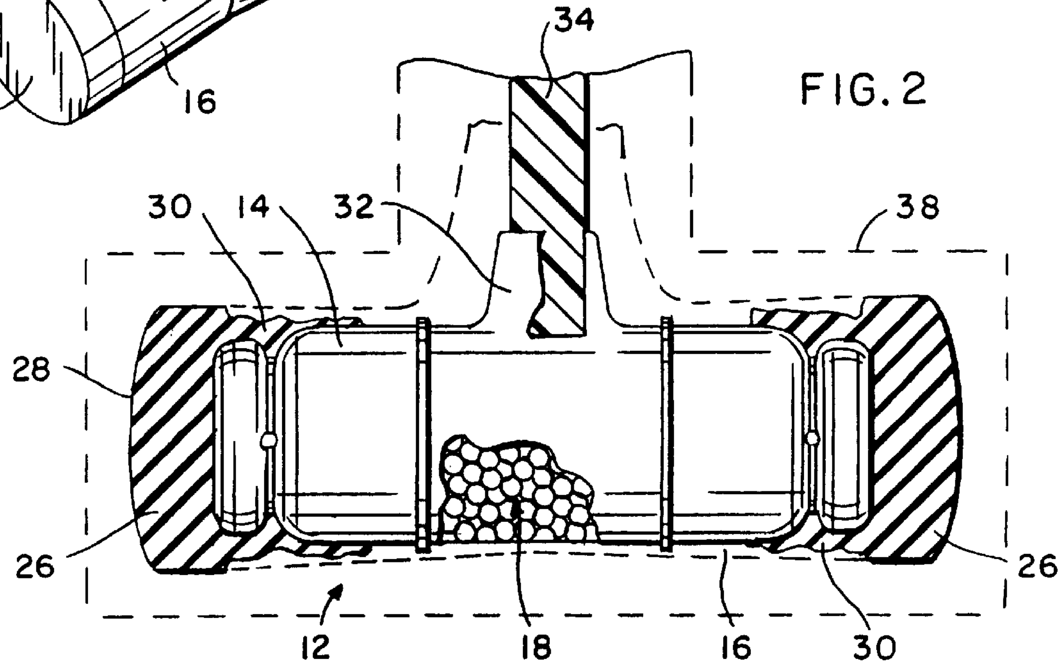
FIG. 2 is an enlarged and fragmented elevational view, shown partially in section, depicting a hollow core canister of an impact head of the tool placed within an injection mold for molding an encasing jacket thereon.

As shown in the exemplary drawings, an impact tool such as a hammer or mallet referred to generally in FIG. 1 by the reference numeral is provided with an impact head 12 comprising a hollow core canister 14 (FIG. 2) encased within an outer cladding or jacket 16 of molded plastic. The hollow canister 14 is partially filled with a relatively high mass and flowable filler material 18 (FIGS. 2–5) to impart nonrecoil or nonrebound characteristics to the tool. In addition, the hollow canister 14 contains a pulverable slug 20 (FIG. 3) which cooperates with the filler material 18 to provide a rigid structural backstop to prevent collapse or other deformation of the canister when the outer jacket 16 is molded thereon, but wherein the slug 20 breaks down substantially to powder form upon impact use of the tool to enable the filler material to shift about for absorbing and dissipating impact shock forces.

The impact tool 10 shown in the illustrative drawings comprises a nonrecoil or nonrebound type hammer wherein the hollow canister 14 comprises an integral portion of the impact hammer head 12. More specifically, as shown by way of example in FIGS. 2–5, the canister 14 has a generally cylindrical shape with a hollow interior filled partially with the flowable filler material such as steel shot pellets or steel pins or the like. The opposite ends of the canister 14 are respectively closed by a pair of impact caps 26 shown in the form of premolded caps or the like adapted for press-fit mounting onto the cylindrical canister 14 and defining a corresponding pair of impact faces 28 for striking a surface during tool use. As shown, the impact caps 26 may each include a mounting sleeve 30 shaped for snap-fit or press-fit mounting onto matingly shaped ends of the canister 14, wherein the mounting sleeve 30 includes an external ribbed or other discontinuous contoured surface for secure interlocking engagement with the outer jacket 16, as will be described in more detail. A mounting neck 32 is formed on the exterior of the canister 14, generally at a centered location along one side thereof, for press-fit or otherwise suitably attached reception of one end of a tool handle 34 extending generally perpendicular to a central axis of the canister. A standard hand grip 36 (FIG. 1) of resilient material may be installed on a substantial remaining portion of the handle 34 to facilitate manual handling and use of the tool.

The above-described impact tool 10 generally corresponds to the construction shown and described in U.S. Pat. Nos. 5,262,113 and 5,375,486, which are incorporated by reference herein. In this regard, the tool head 12 with the handle 34 attached thereto is adapted for placement into an injection mold 38 as shown in dotted lines in FIG. 2. The injection mold 38 has a mold cavity formed therein, and further defines appropriate sprues and gates (not shown) for admitting a molten thermoplastic material under pressure to flow into surrounding relation with at least selected portions of the tool head 12 for purposes of forming the outer jacket 16. FIGS. 2–5 show the jacket 16, which comprises a tough and durable plastic material such as nylon or the like, surrounding the hollow canister 14 and the handle mounting neck 32 to enhance the mechanical connection therebetween. In addition, the jacket 16 is shown covering the mounting sleeves 30 of the impact caps 26 to enhance the retention forces holding the impact caps 26 on the canister 14, while leaving the impact faces 28 thereon exposed for directly contacting a working surface during tool use. Alternately, it will be recognized and understood by persons skilled in the art that the jacket 16 may encase the entire tool head 12 including the impact caps 26, and/or the jacket 16 may be formed to encase the entire tool 10 including the head 12 and the entire handle 34.

In accordance with a primary aspect of the invention, the pulverable slug 20 (FIG. 3) is also placed into the hollow canister 14 prior to the step of molding the outer jacket 16. More specifically, to achieve the desired nonrecoil or nonrebound tool characteristics, the flowable filler material 18 must be free to shift about so that the pellets or the like can slide over one another as the tool is used to strike a working surface. This shifting and sliding of the filler material effectively absorbs and dissipates energy in a manner which counteracts normal rebound reaction forces during impacts. Thus, the tool is easier to control and use, and results in reduced overall worker fatigue. However, to enable the filler material 18 to shift and slide within the tool head 12, the hollow canister 14 can only be partially filled with the filler material.

Figure 3:
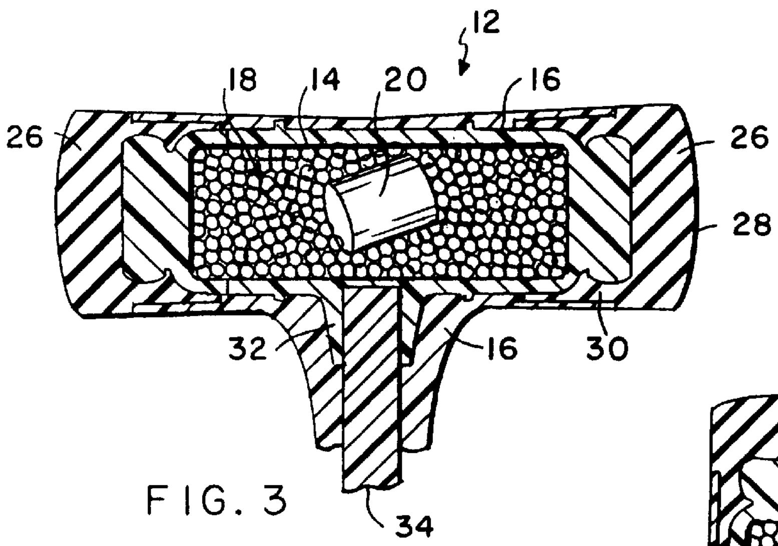
FIG. 3 is a fragmented vertical sectional view depicting the impact head of the tool subsequent to the jacket molding step shown in FIG. 2.

The slug 20 comprises a rigid physical structure placed into the hollow canister 14 prior to molding the outer jacket 16, for the purpose of substantially occupying the residual canister volume which is not otherwise occupied by the flowable filler material 18. To this end, in the preferred form, the slug 20 comprises a stick or plug of a selected material capable of withstanding relatively high compression forces of the type to be encountered during the jacket molding step, so that the slug 20 and the filler material 18 cooperatively define a substantially rigid backstop structure filling the canister 14 to prevent collapse or deformation or any significant distortion of the canister during the jacket molding step. Accordingly, the slug permits use of a relatively lightweight material to form the hollow canister 14, such as a thin-walled metal sleeve or a plastic molded cylinder. As shown in FIG. 3, the slug 20 is desirably placed within the canister at a generally centered position, so that the slug is substantially surrounded by the smaller individual pieces of the filler material 18 which in turn contacts and supports the interior wall surface of the canister 14.

Figure 4:
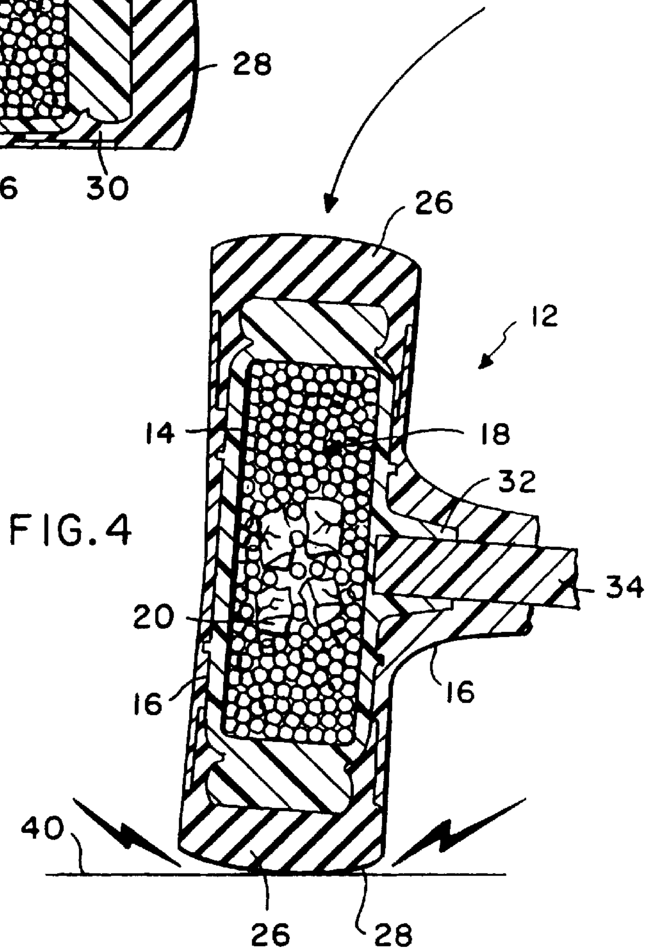
FIG. 4 is a fragmented sectional view similar to FIG. 3, and showing breakdown of a pulverable slug within the impact head during initial impact blows struck by the tool.
Figure 5:
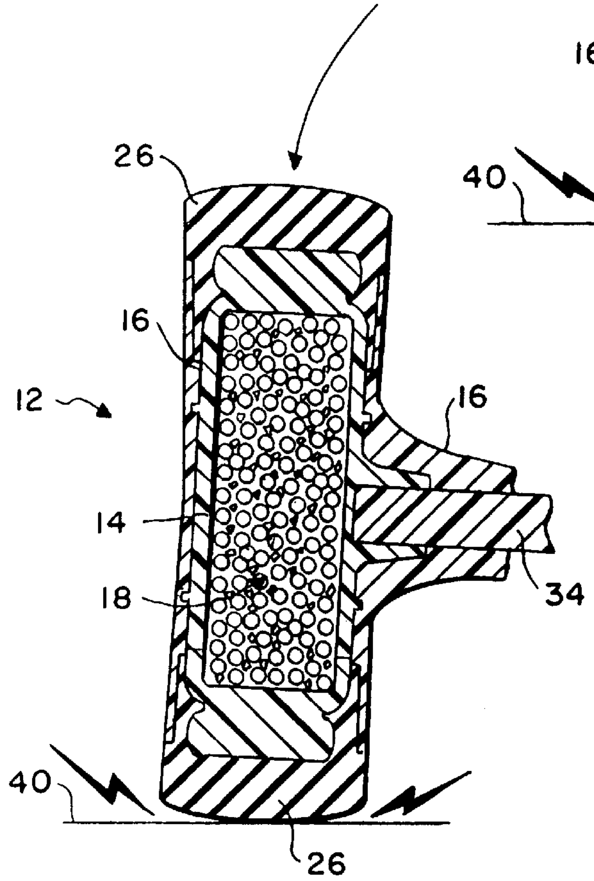
FIG. 5 is another fragmented sectional view similar to FIGS. 3 and 4, but depicting further breakdown of the pulverable slug.

After the encasing outer jacket 16 is molded onto the tool head 12, the pulverable slug 20 is designed to break down into relatively small or fine and preferably powder-like particles. That is, as shown in FIGS. 4 and 5, upon initial use of the tool 10 to impact a working surface 40, the slug 20 is designed to break apart and to be crushed and pulverized by the abrading and grinding action of the filler material 18 in contact therewith. The pulverized slug 20, in substantially powder form, can in a few impact blows by distributed with a high degree of uniformity throughout the hollow canister 14 and into the myriad of small voids inherently present throughout the filler material. When broken down in this form, the slug no longer prevents the filler material 18 from shifting and sliding about during tool use, but instead functions as a dry lubricant within the canister to effectively enhance the desired shifting and sliding of the filler material.

Although the specific material or composition of the pulverable slug 20 may vary, a cementitious stick or plug of a selected lime-based or gypsum-based material such as chalk or plaster of Paris comprises a widely available and highly economical material having high compressive strength to withstand thermoplastic injection molding heat and pressure, while crushing or crumbling substantially to the desired powder form upon the first several impact blows struck by the tool. The overall volume of the slug 20 may also vary, according to the particular size and type of impact tool to be manufactured as well as the resultant degree of tool handling and nonrecoil characteristics.

A variety of further modifications and improvements in and to the improved impact tool of the present invention will be apparent to those persons skilled in the art. Accordingly, no limitation on the invention is intended by way of the foregoing description and accompanying drawings, except at set forth in the appended claims.

What is claimed is:

1. A method of making an impact tool, comprising the steps of:

partially filling a hollow core canister with a flowable filler material, the canister carrying means defining at least one impact face;

substantially filling the residual canister volume with a pulverable slug; and molding an outer jacket encasing at least a portion of said canister;

said filler material and said slug cooperatively forming a substantially rigid structural backstop to prevent deformation of said canister during said molding step, and said slug being pulverized by said filler material into relatively small particles upon initial impact blows struck by the tool to permit the filler material to shift within the canister during subsequent impact blows to absorb and dissipate impact forces.

2. The method of claim 1 wherein the canister has an elongated generally cylindrical shape.

3. The method of claim 1 wherein the flowable filler material comprises a relatively high mass material.

4. The method of claim 1 wherein said step of filling the canister residual volume with the pulverable slug comprises placing the slug generally centrally within the canister in a position substantially surrounded by the flowable filler material.

5. The method of claim 1 wherein the pulverable slug is pulverized by the flowable filler material substantially to powder form.

6. The method of claim 1 wherein the pulverable slug is selected from the group consisting of a chalk stick and a plaster of Paris plug.

7. The method of claim 1 further including the step of connecting a tool handle to the canister.

8. The method of claim 1 further including the step of striking a plurality of initial impact blows with the impact tool to cause the flowable filler material to abrade and pulverize the pulverable slug, and thereby permit the flowable filler material to shift within the canister during subsequent impact blows to absorb and dissipate impact forces.

9. A method of making an impact tool, comprising the steps of:

partially filling a hollow core canister with a flowable filler material;

substantially filling the residual canister volume with a pulverable slug; and molding an outer jacket encasing at least a portion of said canister;

said filler material and said slug cooperatively forming a substantially rigid structural backstop to prevent deformation of said canister during said molding step, and said slug being pulverized by said filler material into relatively small particles upon initial impact blows struck by the tool to permit the filler material to shift within the canister during subsequent impact blows to absorb and dissipate impact forces.

10. The method of claim 9 wherein said step of filling the canister residual volume with the pulverable slug comprises placing the slug generally centrally within the canister in a position substantially surrounded by the flowable filler material.

11. The method of claim 10 wherein the pulverable slug is pulverized by the flowable filler material substantially to powder form.

12. The method of claim 11 wherein the pulverable slug is selected from the group consisting of a chalk stick and a plaster of Paris plug.

13. The method of claim 9 wherein the canister has an elongated generally cylindrical shape.

14. The method of claim 9 wherein the flowable filler material comprises a relatively high mass material.

15. The method of claim 9 further including the step of connecting a tool handle to the canister.

16. The method of claim 9 further including the step of striking a plurality of initial impact blows with the impact tool to cause the flowable filler material to abrade and pulverize the pulverable slug, and thereby permit the flowable filler material to shift within the canister during subsequent impact blows to absorb and dissipate impact forces.

17. A method of making an impact tool, comprising the steps of:

partially filling a hollow core canister with a high mass flowable filler material;

substantially filling the residual canister volume with a pulverable slug;

molding an outer jacket encasing at least a portion of said canister, wherein said filler material and said slug cooperatively form a substantially rigid structural backstop to prevent deformation of said canister during said molding step; and striking a plurality of initial impact blows with the impact tool to cause the flowable filler material to abrade and pulverize the pulverable slug, and thereby permit the flowable filler material to shift within the canister during subsequent impact blows to absorb and dissipate impact forces.

18. The method of claim 17 wherein the canister has an elongated generally cylindrical shape.

19. The method of claim 17 wherein said step of filling the canister residual volume with the pulverable slug comprises placing the slug generally centrally within the canister in a position substantially surrounded by the flowable filler material.

20. The method of claim 17 wherein the pulverable slug is pulverized by the flowable filler material substantially to powder form, and wherein the pulverable slug is selected from the group consisting of a chalk stick and a plaster of Paris plug.

* * * * *